(12) United States Patent
Smith et al.

(10) Patent No.: US 10,781,698 B2
(45) Date of Patent: Sep. 22, 2020

(54) COOLING CIRCUITS FOR A MULTI-WALL BLADE

(71) Applicant: General Electric Company, Schenectady, NY (US)

(72) Inventors: Aaron Ezekiel Smith, Montgomery, OH (US); Gregory Thomas Foster, Greer, SC (US)

(73) Assignee: General Electric Company, Schenectady, NY (US)

(*) Notice: Subject to any disclaimer, the term of this patent is extended or adjusted under 35 U.S.C. 154(b) by 169 days.

(21) Appl. No.: 16/046,066

(22) Filed: Jul. 26, 2018

(65) Prior Publication Data

US 2018/0328192 A1 Nov. 15, 2018

Related U.S. Application Data

(63) Continuation of application No. 14/977,270, filed on Dec. 21, 2015, now Pat. No. 10,060,269.

(51) Int. Cl.
| | | |
|---|---|---|
| *F01D 5/18* | (2006.01) | |
| *F02C 3/04* | (2006.01) | |
| *F02C 7/18* | (2006.01) | |

(52) U.S. Cl.
CPC ............. *F01D 5/187* (2013.01); *F01D 5/186* (2013.01); *F02C 3/04* (2013.01); *F02C 7/18* (2013.01); *F05D 2220/32* (2013.01); *F05D 2240/35* (2013.01); *F05D 2240/81* (2013.01); *F05D 2250/185* (2013.01); *F05D 2260/201* (2013.01); *F05D 2260/202* (2013.01); *F05D 2260/204* (2013.01); *Y02T 50/676* (2013.01)

(58) Field of Classification Search
CPC .... F01D 5/186; F01D 5/187; F05D 2260/202; Y02T 50/675
See application file for complete search history.

(56) References Cited

U.S. PATENT DOCUMENTS

| | | |
|---|---|---|
| 3,191,908 A | 2/1963 | James |
| 4,474,532 A | 10/1984 | Pazder |
| 4,500,258 A | 2/1985 | Dodd et al. |

(Continued)

FOREIGN PATENT DOCUMENTS

| | | |
|---|---|---|
| EP | 2037081 A1 | 3/2009 |
| EP | 3184739 A1 | 6/2017 |
| JP | 2002242607 A | 8/2002 |

OTHER PUBLICATIONS

U.S. Appl. No. 14/977,175, Office Action dated Nov. 24, 2017, 25 pages.

(Continued)

*Primary Examiner* — Scott J Walthour
(74) *Attorney, Agent, or Firm* — James Pemrick; Hoffman Warnick LLC (57) ABSTRACT

A cooling system according to an embodiment includes: a leading edge cooling circuit including a pressure side serpentine circuit and a suction side serpentine circuit; a first mid-blade cooling circuit including a suction side serpentine circuit; a second mid-blade cooling circuit including a pressure side serpentine circuit; a trailing edge cooling circuit; and at least one air feed for supplying cooling air to the leading edge cooling circuit, the first mid-blade cooling circuit, the second mid-blade cooling circuit, and the trailing edge cooling circuit.

16 Claims, 7 Drawing Sheets

(56) References Cited

U.S. PATENT DOCUMENTS

| | | | |
|---|---|---|---|
| 4,650,399 | A | 3/1987 | Craig et al. |
| 4,753,575 | A | 6/1988 | Lenvengood et al. |
| 5,296,308 | A | 3/1994 | Caccavale et al. |
| 5,356,265 | A | 10/1994 | Kercher |
| 5,382,135 | A | 1/1995 | Green |
| 5,403,159 | A | 4/1995 | Green et al. |
| 5,702,232 | A | 12/1997 | Moore |
| 5,813,835 | A | 9/1998 | Corsmeier et al. |
| 5,853,044 | A | 12/1998 | Wheaton et al. |
| 6,109,579 | A | 2/2000 | Huang |
| 6,196,792 | B1 | 3/2001 | Lee et al. |
| 6,220,817 | B1 | 4/2001 | Durgin et al. |
| 6,264,428 | B1 | 7/2001 | Dailey et al. |
| 6,416,284 | B1 | 7/2002 | Demers et al. |
| 6,478,535 | B1 | 11/2002 | Chung et al. |
| 6,491,496 | B2 | 12/2002 | Starkweather |
| 6,705,836 | B2 | 3/2004 | Bourriaud et al. |
| 6,887,033 | B1 | 5/2005 | Phillips et al. |
| 6,916,155 | B2 | 7/2005 | Eneau et al. |
| 6,974,308 | B2 | 12/2005 | Halfmann et al. |
| 7,104,757 | B2 | 9/2006 | Gross |
| 7,217,097 | B2 | 5/2007 | Liang |
| 7,303,376 | B2 | 12/2007 | Liang |
| 7,416,391 | B2 | 8/2008 | Veltre et al. |
| 7,458,778 | B1 | 12/2008 | Liang |
| 7,481,623 | B1 | 1/2009 | Liang |
| 7,527,474 | B1 | 5/2009 | Liang |
| 7,527,475 | B1 | 5/2009 | Liang |
| 7,607,891 | B2 | 10/2009 | Cherolis et al. |
| 7,625,178 | B2 | 12/2009 | Morris et al. |
| 7,686,581 | B2 | 3/2010 | Brittingham et al. |
| 7,780,413 | B2 | 8/2010 | Liang |
| 7,780,415 | B2 | 8/2010 | Liang |
| 7,785,072 | B1 | 8/2010 | Liang |
| 7,819,629 | B2 | 10/2010 | Liang |
| 7,838,440 | B2 | 11/2010 | Park |
| 7,857,589 | B1 | 12/2010 | Liang |
| 7,862,299 | B1 | 1/2011 | Liang |
| 7,901,183 | B1 | 3/2011 | Liang |
| 7,914,257 | B1 | 3/2011 | Liang |
| 7,980,822 | B2 | 7/2011 | Cunha et al. |
| 8,011,888 | B1 | 9/2011 | Liang |
| 8,047,790 | B1 | 11/2011 | Liang |
| 8,057,183 | B1 | 11/2011 | Liang |
| 8,087,891 | B1 | 1/2012 | Liang |
| 8,157,505 | B2 | 4/2012 | Liang |
| 8,292,582 | B1 | 10/2012 | Liang |
| 8,297,927 | B1 * | 10/2012 | Liang .............. F01D 5/186 416/97 R |
| 8,444,386 | B1 | 5/2013 | Liang |
| 8,616,845 | B1 | 12/2013 | Liang |
| 8,678,766 | B1 | 3/2014 | Liang |
| 8,734,108 | B1 | 5/2014 | Liang |
| 10,054,055 | B2 | 8/2018 | Spangler et al. |
| 2003/0223862 | A1 | 12/2003 | DeMarche et al. |
| 2005/0008487 | A1 | 1/2005 | Lee et al. |
| 2005/0025623 | A1 | 2/2005 | Botrel et al. |
| 2005/0031452 | A1 | 2/2005 | Liang |
| 2005/0226726 | A1 | 10/2005 | Lee et al. |
| 2006/0222495 | A1 | 10/2006 | Liang |
| 2007/0128031 | A1 | 6/2007 | Liang |
| 2007/0128032 | A1 | 7/2007 | Lee et al. |
| 2007/0189896 | A1 | 8/2007 | Itzel et al. |
| 2008/0118366 | A1 | 5/2008 | Correia et al. |
| 2008/0175714 | A1 | 7/2008 | Spangler et al. |
| 2009/0104042 | A1 | 4/2009 | Liang |
| 2009/0175733 | A1 | 7/2009 | Poon et al. |
| 2009/0232660 | A1 | 9/2009 | Liang |
| 2010/0104419 | A1 | 4/2010 | Liang |
| 2011/0123310 | A1 | 5/2011 | Beattie et al. |
| 2011/0236221 | A1 | 9/2011 | Campbell |
| 2012/0082566 | A1 | 4/2012 | Ellis et al. |
| 2012/0207614 | A1 | 8/2012 | Lee et al. |
| 2013/0171003 | A1 | 7/2013 | Ellis et al. |
| 2014/0064984 | A1 | 3/2014 | Zhang et al. |
| 2014/0096538 | A1 | 4/2014 | Boyer et al. |
| 2015/0059355 | A1 | 3/2015 | Feigl et al. |
| 2015/0110641 | A1 | 4/2015 | Herzlinger et al. |
| 2015/0184519 | A1 | 7/2015 | Foster et al. |
| 2015/0184538 | A1 | 7/2015 | Smith |
| 2015/0322008 | A1 | 11/2015 | Hilpert et al. |
| 2016/0194965 | A1 | 7/2016 | Spangler |
| 2016/0312632 | A1 | 10/2016 | Hagan et al. |
| 2016/0312637 | A1 | 10/2016 | Duguay |
| 2017/0173672 | A1 | 6/2017 | Foster et al. |
| 2017/0175244 | A1 | 6/2017 | Detor et al. |
| 2017/0175443 | A1 | 6/2017 | Pesticcio |
| 2017/0175540 | A1 | 6/2017 | Weber et al. |
| 2017/0175541 | A1 | 6/2017 | Weber et al. |
| 2017/0175542 | A1 | 6/2017 | Weber et al. |
| 2017/0175544 | A1 | 6/2017 | Smith et al. |
| 2017/0175545 | A1 | 6/2017 | Foster et al. |
| 2017/0175546 | A1 | 6/2017 | Smith et al. |
| 2017/0175547 | A1 | 6/2017 | Smith et al. |
| 2017/0175548 | A1 | 6/2017 | Smith et al. |
| 2017/0175549 | A1 | 6/2017 | Weber et al. |
| 2017/0175550 | A1 | 6/2017 | Smith et al. |
| 2017/0198594 | A1 | 7/2017 | Takamura et al. |
| 2018/0051573 | A1 | 2/2018 | Weber et al. |
| 2018/0051574 | A1 | 2/2018 | Weber et al. |
| 2018/0051575 | A1 | 2/2018 | Weber et al. |
| 2018/0051576 | A1 | 2/2018 | Weber et al. |
| 2018/0051577 | A1 | 2/2018 | Leary et al. |

OTHER PUBLICATIONS

U.S. Appl. No. 14/977,270, Notice of Allowance dated Jul. 13, 2018, 24 pages.

Extended European Search Report and Opinion issued in connection with corresponding EP Application No. 17186614.8 dated Jan. 25, 2018, 7 pages.

U.S. Appl. No. 15/239,968, Office Action dated Aug. 27, 2018, 42 pages.

U.S. Appl. No. 15/239,940, Office Action dated Aug. 27, 2018, 41 pages.

U.S. Appl. No. 15/239,930, Office Action dated Aug. 27, 2018, 47 pages.

U.S. Appl. No. 15/239,985, Office Action dated Aug. 29, 2018, 40 pages.

U.S. Appl. No. 14/977,078, Notice of Allowance dated Sep. 20, 2018, 22 pages.

U.S. Appl. No. 15/239,930, Notice of Allowance dated Dec. 6, 2018, 10 pages.

U.S. Appl. No. 15/239,994, Office Action dated Dec. 10, 2018, 13 pages.

U.S. Appl. No. 15/239,968, Notice of Allowance dated Dec. 12, 2018, 18 pages.

U.S. Appl. No. 15/239,985, Notice of Allowance dated Dec. 12, 2018, 12 pages.

U.S. Appl. No. 15/239,940, Notice of Allowance dated Dec. 28, 2018, 11 pages.

EP Search Report and Written Opinion for corresponding EP Patent Application No. 16203125.6 dated Apr. 28, 2017; 7 pages.

U.S. Appl. No. 14/977,102; Notice of Allowance dated Jul. 17, 2018; 18 pages.

U.S. Appl. No. 14/977,078; Office Action dated Apr. 19, 2018; 39 pages.

U.S. Appl. No. 14/977,200; Notice of Allowance dated May 2, 2018; 18 pages.

U.S. Appl. No. 14/977,124; Notice of Allowance dated Mar. 19, 2018; 21 pages.

U.S. Appl. No. 14/977,102; Office Action dated Mar. 30, 2018; 39 pages.

U.S. Appl. No. 14/977,228; Notice of Allowance dated Feb. 12, 2018; 34 Pages.

U.S. Appl. No. 14/977,247; Notice of Allowance dated Feb. 12, 2018; 24 Pages.

U.S. Appl. No. 14/977,152; Office Action 1 dated Sep. 14, 2017; 15 pages.

(56) References Cited

OTHER PUBLICATIONS

U.S. Appl. No. 14/977,124; Office Action 1 dated Oct. 10, 2017; 15 pages.
U.S. Appl. No. 14/977,200; Office Action dated Dec. 19, 2017; 23 pages.

* cited by examiner

COOLING CIRCUITS FOR A MULTI-WALL BLADE

BACKGROUND

The disclosure relates generally to turbine systems, and more particularly, to cooling circuits for a multi-wall blade.

Gas turbine systems are one example of turbomachines widely utilized in fields such as power generation. A conventional gas turbine system includes a compressor section, a combustor section, and a turbine section. During operation of a gas turbine system, various components in the system, such as turbine blades, are subjected to high temperature flows, which can cause the components to fail. Since higher temperature flows generally result in increased performance, efficiency, and power output of a gas turbine system, it is advantageous to cool the components that are subjected to high temperature flows to allow the gas turbine system to operate at increased temperatures.

Turbine blades typically contain an intricate maze of internal cooling channels. Cooling air provided by, for example, a compressor of a gas turbine system may be passed through the internal cooling channels to cool the turbine blades.

Multi-wall turbine blade cooling systems may include internal near wall cooling circuits. Such near wall cooling circuits may include, for example, near wall cooling channels adjacent the outside walls of a multi-wall blade. The near wall cooling channels are typically small, requiring less cooling flow, while still maintaining enough velocity for effective cooling to occur. Other, typically larger, low cooling effectiveness central channels of a multi-wall blade may be used as a source of cooling air and may be used in one or more reuse circuits to collect and reroute "spent" cooling flow for redistribution to lower heat load regions of the multi-wall blade.

BRIEF DESCRIPTION

A first aspect of the disclosure provides a cooling system including:
a leading edge cooling circuit including pressure side serpentine circuit and a suction side serpentine circuit; a first mid-blade cooling circuit including a suction side serpentine circuit; a second mid-blade cooling circuit including a pressure side serpentine circuit; a trailing edge cooling circuit; and at least one air feed for supplying cooling air to the leading edge cooling circuit, the first mid-blade cooling circuit, the second mid-blade cooling circuit, and the trailing edge cooling circuit.

A second aspect of the disclosure provides a multi-wall turbine blade, comprising: a cooling system disposed within the multi-wall turbine blade, the cooling system including: a leading edge cooling circuit including a pressure side serpentine circuit and a suction side serpentine circuit; a first mid-blade cooling circuit including a suction side serpentine circuit; a second mid-blade cooling circuit including a pressure side serpentine circuit; a trailing edge cooling circuit; and at least one air feed for supplying cooling air to the leading edge cooling circuit, the first mid-blade cooling circuit, the second mid-blade cooling circuit, and the trailing edge cooling circuit.

A third aspect of the disclosure provides a turbomachine, including:
a gas turbine system including a compressor component, a combustor component, and a turbine component, the turbine component including a plurality of turbomachine blades, and wherein at least one of the turbomachine blades includes a multi-wall blade; and a cooling system disposed within the multi-wall blade, the cooling system including: a leading edge cooling circuit including a pressure side serpentine circuit and a suction side serpentine circuit; a first mid-blade cooling circuit including a suction side serpentine circuit; a second mid-blade cooling circuit including a pressure side serpentine circuit; a trailing edge cooling circuit including a serpentine circuit; and at least one air feed for supplying cooling air to the leading edge cooling circuit, the first mid-blade cooling circuit, the second mid-blade cooling circuit, and the trailing edge cooling circuit.

The illustrative aspects of the present disclosure solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure.

It is noted that the drawing of the disclosure is not to scale. The drawing is intended to depict only typical aspects of the disclosure, and therefore should not be considered as limiting the scope of the disclosure. In the drawing, like numbering represents like elements between the drawings.

DETAILED DESCRIPTION

As indicated above, the disclosure relates generally to turbine systems, and more particularly, to cooling circuits for cooling a multi-wall blade.

According to embodiments, a plurality of cooling circuits are provided for cooling a multi-wall blade of a gas turbine engine. The plurality of cooling circuits use a lower total amount of cooling air than traditional cooling methodologies. This increases the output and efficiency of the gas turbine engine.

In the Figures (see, e.g., FIG. 11), the "A" axis represents an axial orientation. As used herein, the terms "axial" and/or "axially" refer to the relative position/direction of objects along axis A, which is substantially parallel with the axis of rotation of the turbomachine (in particular, the rotor section). As further used herein, the terms "radial" and/or "radially" refer to the relative position/direction of objects along an axis "r" (see, e.g., FIG. 1), which is substantially perpendicular with axis A and intersects axis A at only one location. Additionally, the terms "circumferential" and/or "circumferentially" refer to the relative position/direction of objects along a circumference (c) which surrounds axis A but does not intersect the axis A at any location.

Figure 1:
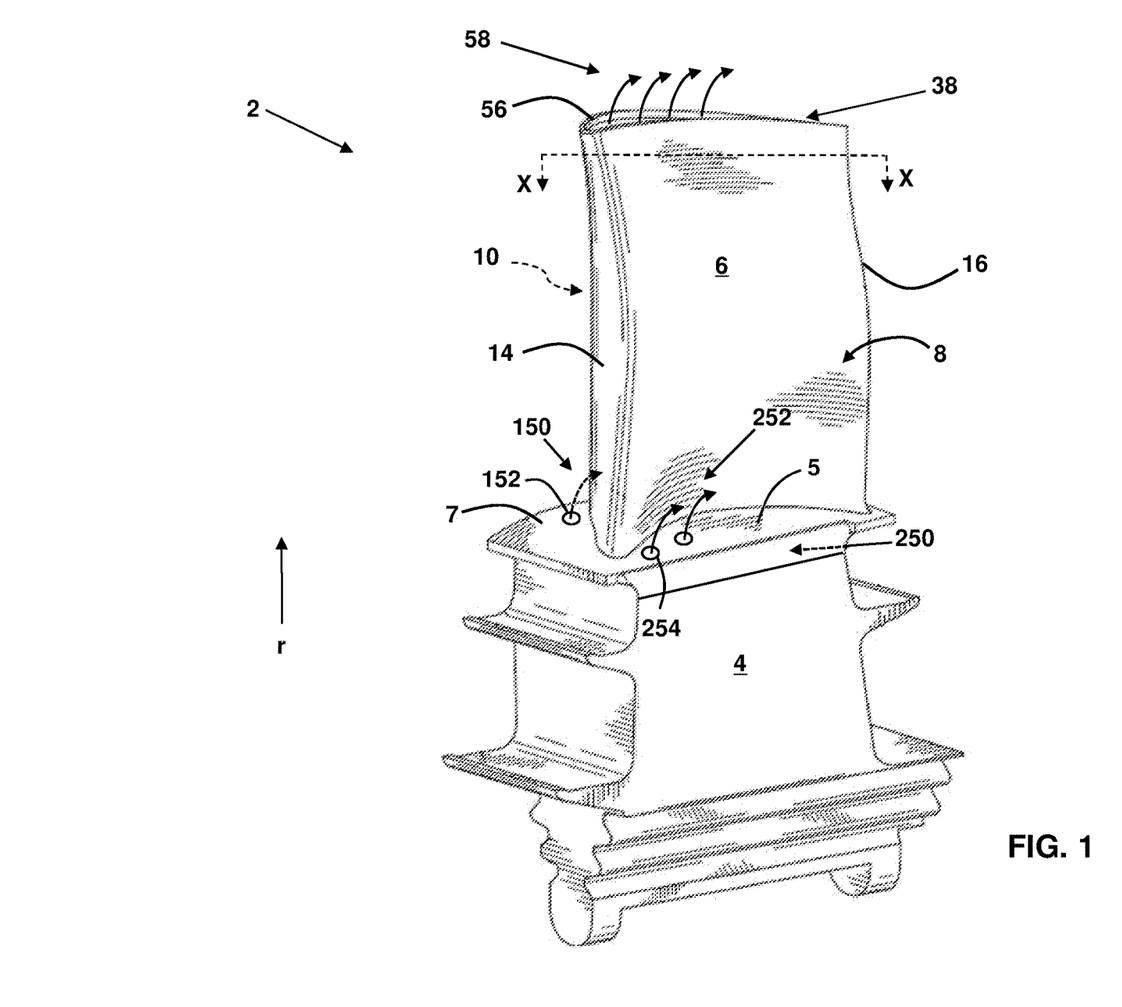
FIG. 1 shows a perspective view of a multi-wall blade according to embodiments.

Turning to FIG. 1, a perspective view of a turbomachine blade 2 is shown. The turbomachine blade 2 includes a shank 4 and a multi-wall blade 6 coupled to and extending radially outward from the shank 4. The multi-wall blade 6 includes a pressure side 8, an opposed suction side 10, and a tip area 38. The multi-wall blade 6 further includes a leading edge 14 between the pressure side 8 and the suction side 10, as well as a trailing edge 16 between the pressure side 8 and the suction side 10 on a side opposing the leading edge 14. The multi-wall blade 6 extends radially away from a pressure side platform 5 and a suction side platform 7.

The shank 4 and multi-wall blade 6 may each be formed of one or more metals (e.g., nickel, alloys of nickel, etc.) and may be formed (e.g., cast, forged or otherwise machined) according to conventional approaches. The shank 4 and multi-wall blade 6 may be integrally formed (e.g., cast, forged, three-dimensionally printed, etc.), or may be formed as separate components which are subsequently joined (e.g., via welding, brazing, bonding or other coupling mechanism).

Figure 2:
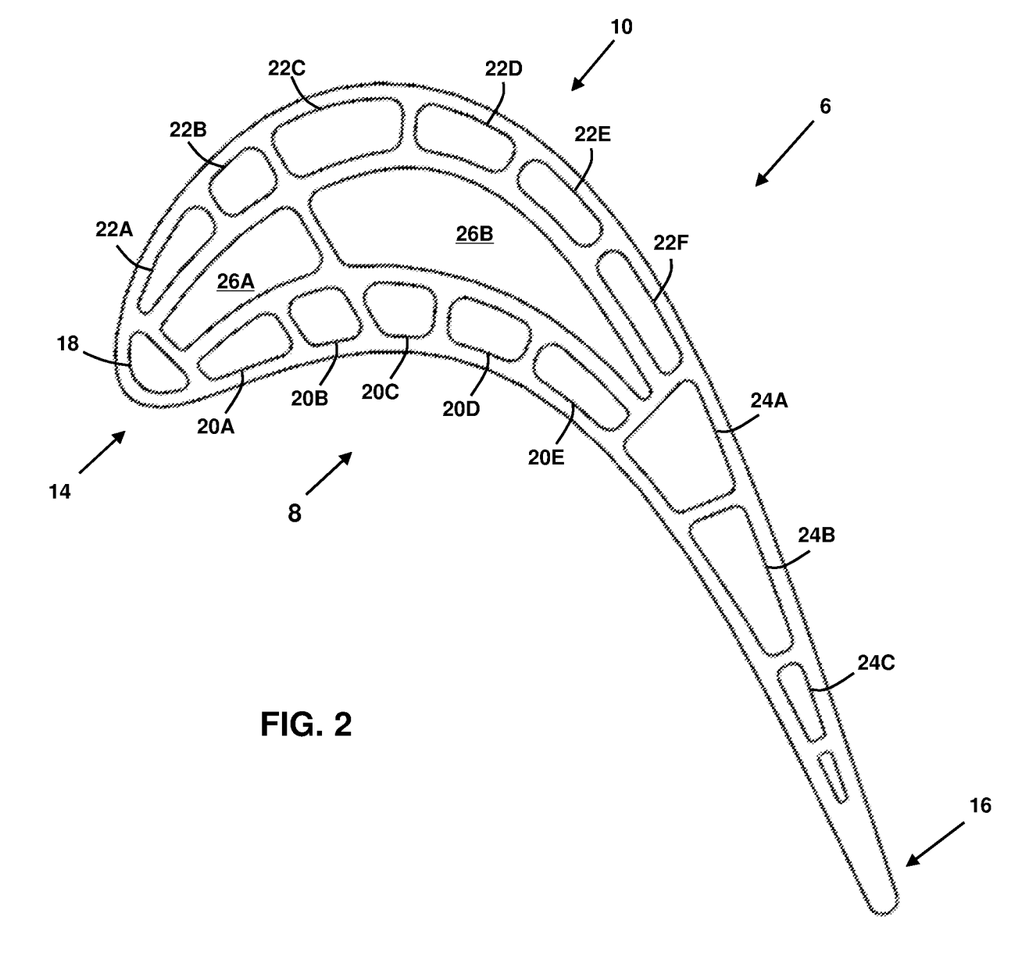
FIG. 2 is a cross-sectional view of the multi-wall blade of FIG. 1, taken along line X-X in FIG. 1 according to various embodiments.

FIG. 2 depicts a cross-sectional view of the multi-wall blade 6 taken along line X-X of FIG. 1. As shown, the multi-wall blade 6 may include a plurality of internal cavities. In embodiments, the multi-wall blade 6 includes a leading edge cavity 18, a plurality of pressure side (near wall) cavities 20A-20E, a plurality of suction side (near wall) cavities 22A-22F, a plurality of trailing edge cavities 24A-24C, and a plurality of central cavities 26A, 26B. The number of cavities 18, 20, 22, 24, 26 within the multi-wall blade 6 may vary, of course, depending upon for example, the specific configuration, size, intended use, etc., of the multi-wall blade 6. To this extent, the number of cavities 18, 20, 22, 24, 26 shown in the embodiments disclosed herein is not meant to be limiting. According to embodiments, various cooling circuits can be provided using different combinations of the cavities 18, 20, 22, 24, 26.

Figure 3:
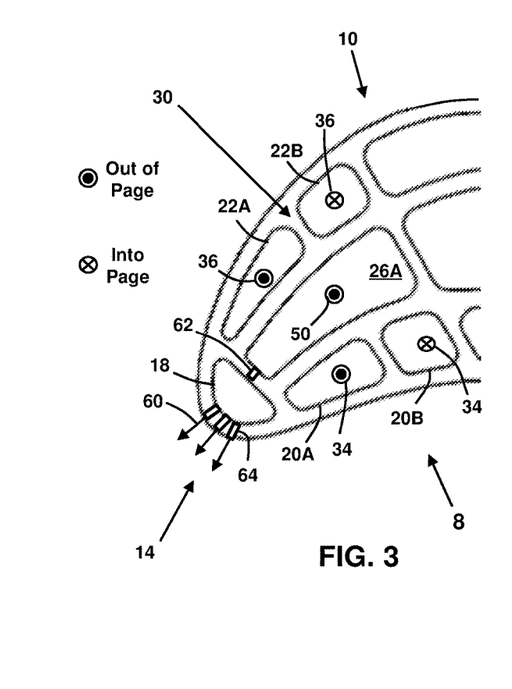
FIG. 3 depicts a portion of the cross-sectional view of FIG. 2 showing a leading edge cooling circuit according to various embodiments.
Figure 4:
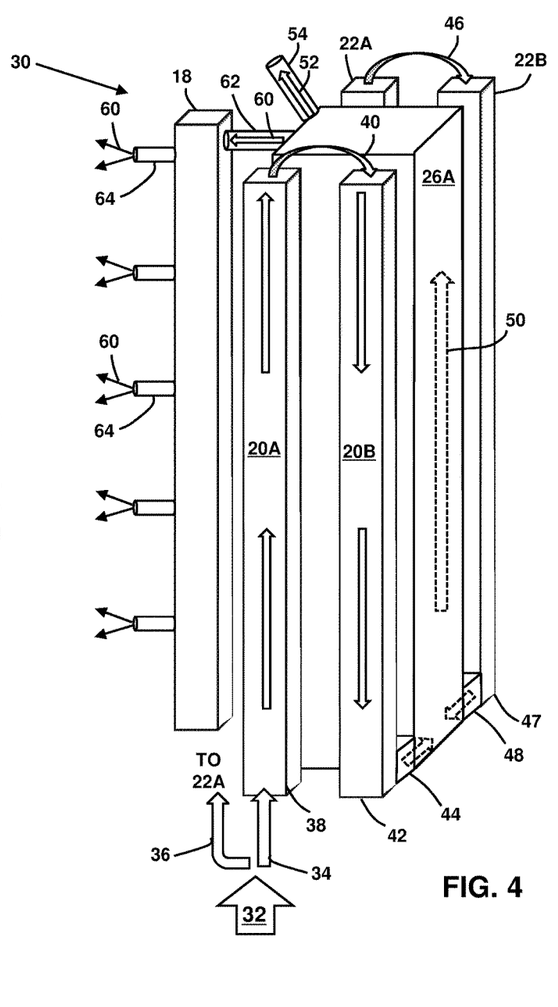
FIG. 4 is a perspective view of the leading edge cooling circuit according to various embodiments.

An embodiment including an leading edge cooling circuit 30 is depicted in FIGS. 3 and 4. As the name indicates, the leading edge cooling circuit 30 is located adjacent the leading edge 14 of the multi-wall blade 6, between the pressure side 8 and suction side 10 of the multi-wall blade 6.

Referring simultaneously to FIGS. 3 and 4, a supply of cooling air 32, generated for example by a compressor 104 of a gas turbine system 102 (FIG. 11), is fed through the shank 4 (FIG. 1) to the leading edge cooling circuit 30 (e.g., via at least one cooling air feed). A first portion 34 of the cooling air 32 is fed to a base 38 of the pressure side cavity 20A, which forms the first leg of an aft-flowing two-pass serpentine circuit adjacent the pressure side 8 of the multi-wall blade 6. A second portion 36 of the cooling air 32 is fed to a base (not shown) of the suction side cavity 22A, which forms the first leg of an aft-flowing two-pass serpentine circuit adjacent the suction side 10 of the multi-wall blade 6.

As depicted in FIGS. 3 and 4 together with FIG. 1, the cooling air 34 flows radially outward through the pressure side cavity 20A toward a tip area 38 of the multi-wall blade 6. A turn 40 redirects the cooling air 34 from the pressure side cavity 20A into the pressure side cavity 20B, which forms the second leg of the two-pass serpentine circuit adjacent the pressure side 8 of the multi-wall blade 6. The cooling air 34 flows radially inward through the pressure side cavity 20B toward a base 42 of the pressure side cavity 20B, and then flows through a passage 44 into the central cavity 26A. In a corresponding manner, the cooling air 36 flows radially outward through the suction side cavity 22A toward the tip area 38 of the multi-wall blade 6. A turn 46 redirects the cooling air 36 from the suction side cavity 22A into the suction side cavity 22B, which forms the second leg of the two-pass serpentine circuit adjacent the suction side 10 of the multi-wall blade 6. The cooling air 36 flows radially inward through the suction side cavity 22B toward a base 47 of the suction side cavity 22B, and then flows through a passage 48 into the central cavity 26A.

After passing into the central cavity 26A, the cooling air 34, 36 combines into a single flow of cooling air 50, which flows radially outward through the central cavity 26A toward the tip area 38 of the multi-wall blade 6. A first portion 52 of the cooling air 50 is directed by at least one tip film channel 54 from the central cavity 26A to the tip 56 of the multi-wall blade 6. The cooling air 52 is exhausted from the tip 56 of the multi-wall blade 6 as tip film 58 to provide tip film cooling.

A second portion 60 of the cooling air 50 is directed by at least one impingement hole 62 from the central cavity 26A to the leading edge cavity 18. The cooling air 60 flows out of the leading edge cavity 18 to the leading edge 14 of the multi-wall blade 6 via at least one film hole 64 to provide film cooling of the leading edge 14.

The leading edge cooling circuit 30 has been described as including two aft-flowing two-pass serpentine circuits. However, two forward-flowing two-pass serpentine circuits or a combination of an aft-flowing two-pass serpentine circuit and a forward flowing two-pass serpentine circuit may also be used. Such circuits may be provided, for example, by suitably adjusting the flow direction of the cooling air through the various pressure and suction side cavities 20A, 20B, 22A, and 22B.

Figure 5:
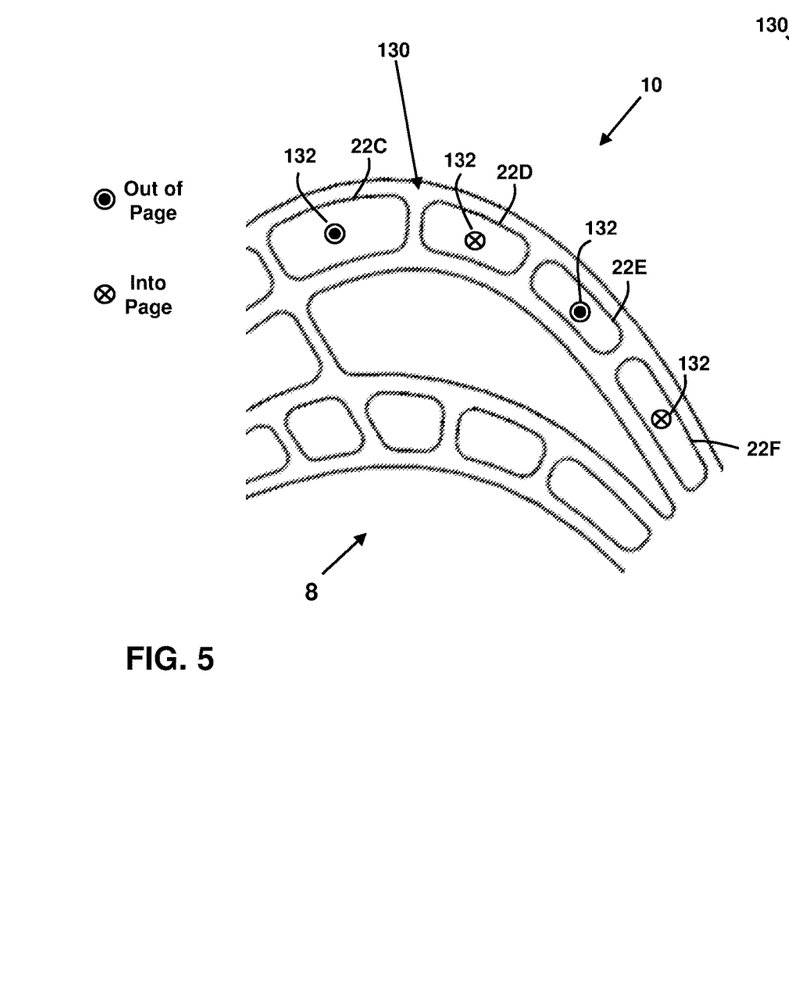
FIG. 5 depicts a portion of the cross-sectional view of FIG. 2 showing a mid-blade suction side cooling circuit according to various embodiments.
Figure 6:
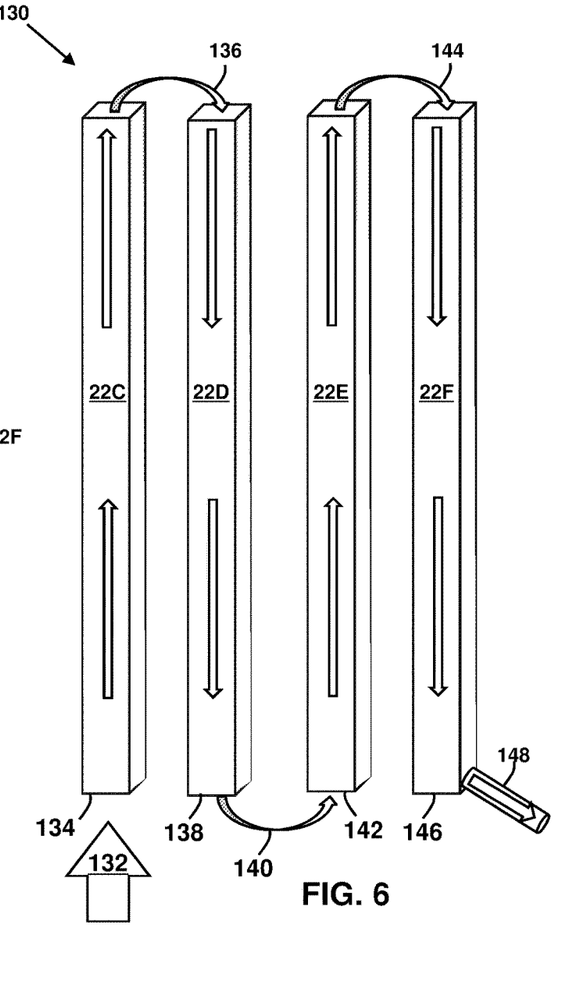
FIG. 6 is a perspective view of the mid-blade suction side cooling circuit according to various embodiments.

An embodiment including a mid-blade suction side cooling circuit 130 is depicted in FIGS. 5 and 6. The suction side cooling circuit 130 is located adjacent the suction side 10 of the multi-wall blade 6, between the leading edge 14 and the trailing edge 16. The suction side cooling circuit 130 is an aft-flowing four-pass serpentine circuit formed by suction side cavities 22C, 22D, 22E, and 22F.

Referring to FIGS. 5 and 6 together with FIG. 1, a supply of cooling air 132, generated for example by a compressor 104 of a gas turbine system 102 (FIG. 11), is fed (e.g., via at least one cooling air feed) through the shank 4 to a base 134 of the suction side cavity 22C. The cooling air 132 flows radially outward through the suction side cavity 22C toward a tip area 38 of the multi-wall blade 6. A turn 136 redirects the cooling air 132 from the suction side cavity 22C into the suction side cavity 22D. The cooling air 132 flows radially inward through the suction side cavity 22D toward a base 138 of the suction side cavity 22D. A turn 140 redirects the cooling air 132 from the base 138 of the suction side cavity 22D into a base 142 of the suction side cavity 22E. The cooling air 132 flows radially outward through the suction side cavity 22E toward the tip area 38 of the multi-wall blade 6. A turn 144 redirects the cooling air 132 from the suction side cavity 22E into the suction side cavity 22F. The cooling air 132 flows radially inward through the suction side cavity 22F toward a base 146 of the suction side cavity 22F.

After flowing out of the base 146 of the suction side cavity 22F, the cooling air 132 is directed by at least one channel 148 to the suction side platform 7. At the suction side platform 7, the cooling air is exhausted as cooling film 150 via at least one film aperture 152 to provide film cooling of the suction side platform 7.

The mid-blade suction side cooling circuit 130 has been described as including a aft-flowing four-pass serpentine circuit. However, a forward-flowing four-pass serpentine cooling circuit provided for example, by reversing the flow direction of the cooling air through the suction side cavities 22C-22F, may also be used.

Figures 7, 8:
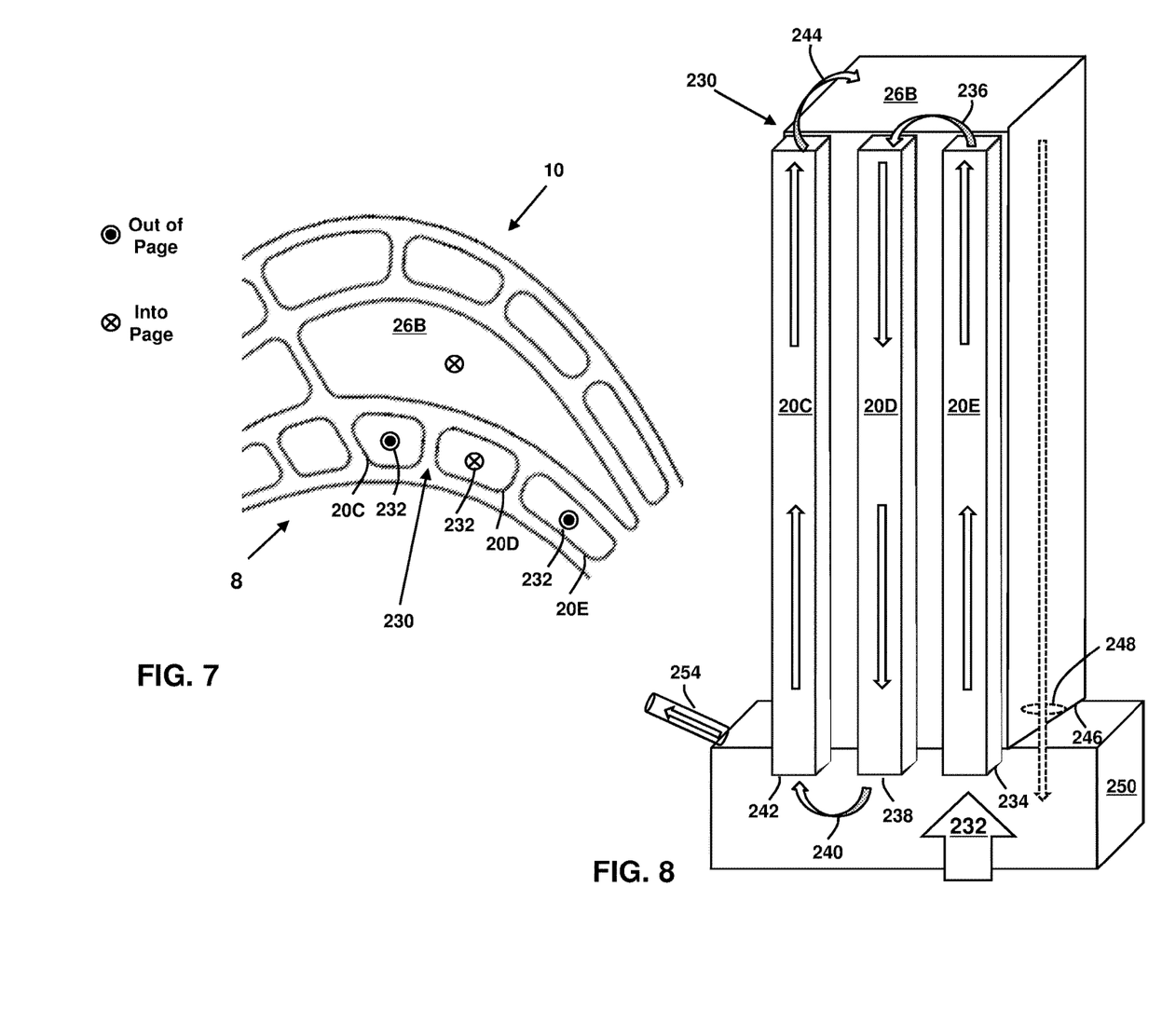
FIG. 7 depicts a portion of the cross-sectional view of FIG. 2 showing a mid-blade pressure side cooling circuit according to various embodiments.
FIG. 8 is a perspective view of the mid-blade pressure side cooling circuit according to various embodiments.

An embodiment including a mid-blade pressure side cooling circuit 230 is depicted in FIGS. 7 and 8. The pressure side cooling circuit 230 is located adjacent the pressure side 8 of the multi-wall blade 6, between the leading edge 14 and the trailing edge 16. The pressure side cooling circuit 230 is a forward-flowing three-pass serpentine circuit formed by pressure side cavities 20C, 20D, and 22E.

Referring to FIGS. 7 and 8 together with FIG. 1, a supply of cooling air 232, generated for example by a compressor 104 of a gas turbine system 102 (FIG. 11), is fed (e.g., via at least one cooling air feed) through the shank 4 to a base 234 of the pressure side cavity 20E. The cooling air 232 flows radially outward through the pressure side cavity 20E toward a tip area 38 of the multi-wall blade 6. A turn 236 redirects the cooling air 232 from the pressure side cavity 20E into the pressure side cavity 20D. The cooling air 232 flows radially inward through the pressure side cavity 20D toward a base 238 of the pressure side cavity 20D. A turn 240 redirects the cooling air 232 from the base 238 of the pressure side cavity 20D into a base 242 of the pressure side cavity 20E. The cooling air 232 flows radially outward through the pressure side cavity 20C toward the tip area 38 of the multi-wall blade 6. A turn 244 redirects the cooling air 232 from the pressure side cavity 20C into the central cavity 26B. The cooling air 232 flows radially inward through the central cavity 26B toward a base 246 of the central cavity 26B.

At least one passage 248 fluidly couples the base 246 of the central cavity 26B to a core 250 of the pressure side platform 5. The cooling air 232 flows through the passage 248 into the pressure side platform core 250, cooling the pressure side platform 5. The cooling air 232 then exits as cooling film 252 from the pressure side platform 5 via at least one film aperture 254 (FIG. 1) to provide film cooling of the pressure side platform 5.

The mid-blade pressure side cooling circuit 230 has been described as including a forward-flowing three-pass serpentine circuit. However, an aft-flowing three-pass serpentine cooling circuit provided for example, by reversing the flow direction of the cooling air through the pressure side cavities 20C-20E, may also be used.

Figures 9, 10:
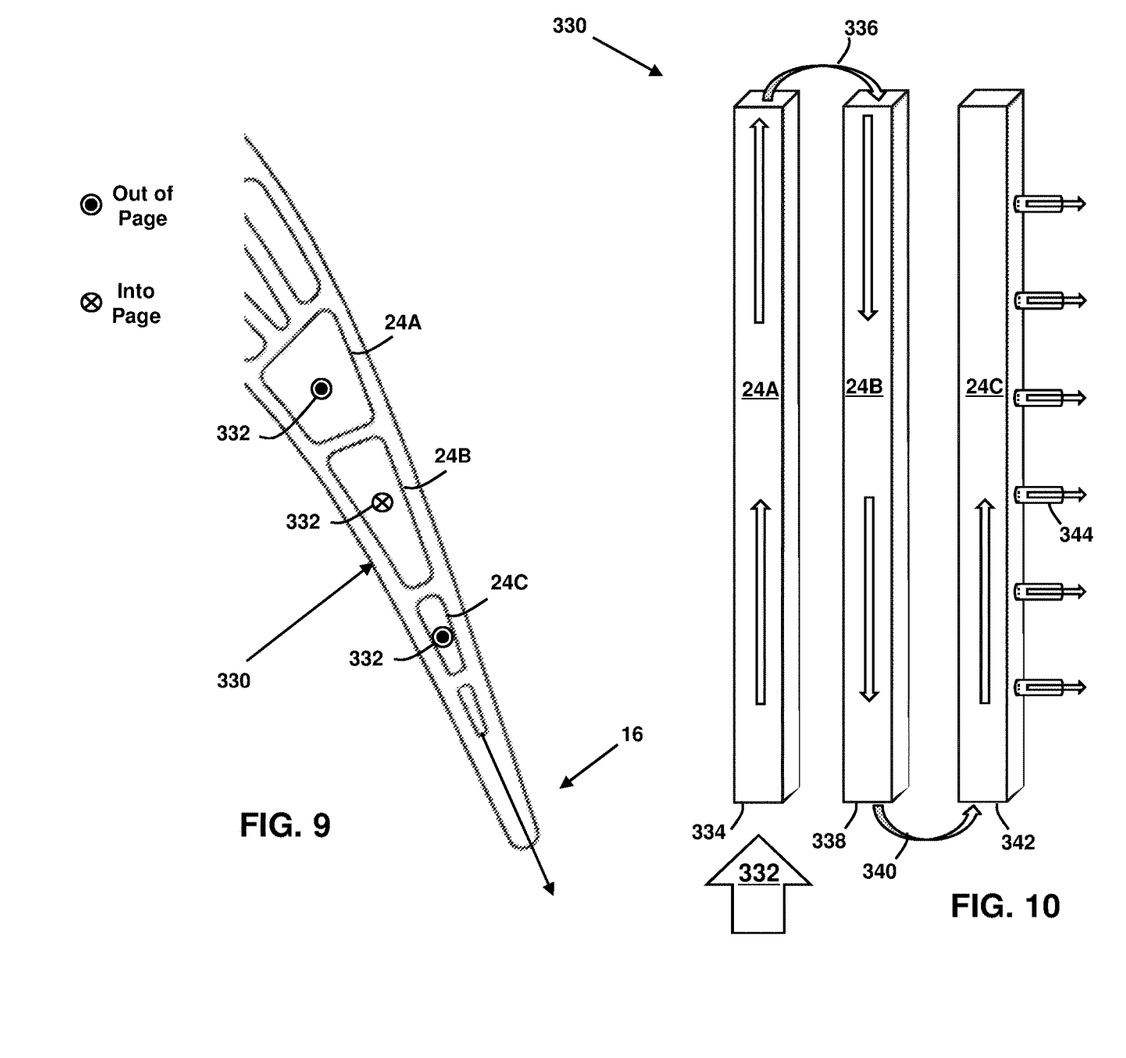
FIG. 9 depicts a portion of the cross-sectional view of FIG. 2 showing a trailing edge cooling circuit according to various embodiments.
FIG. 10 is a perspective view of the trailing edge cooling circuit according to various embodiments.

An embodiment including a trailing edge cooling circuit 330 is depicted in FIGS. 9 and 10. The trailing edge cooling circuit 330 is located adjacent the trailing edge 16 of the multi-wall blade 6. The trailing edge cooling circuit 330 is an aft-flowing three-pass serpentine circuit formed by trailing edge cavities 24A, 24B, and 24C.

Referring to FIGS. 9 and 10 together with FIG. 1, a supply of cooling air 332, generated for example by a compressor 104 of a gas turbine system 102 (FIG. 11), is fed (e.g., via at least one cooling air feed) through the shank 4 (FIG. 1) to a base 334 of the trailing edge cavity 24A. The cooling air 332 flows radially outward through the trailing edge cavity 24A toward a tip area 38 of the multi-wall blade 6. A turn 336 redirects the cooling air 332 from the trailing edge cavity 24A into the trailing edge cavity 24B. The cooling air 332 flows radially inward through the trailing edge cavity 24B toward a base 338 of the trailing edge cavity 24B. A turn 340 redirects the cooling air 332 from the base 338 of the trailing edge cavity 24B into a base 342 of the trailing edge cavity 24C. The cooling air 332 flows radially outward through the trailing edge cavity 24C. The cooling air 332 is exhausted from the trailing edge cavity 24C to the trailing edge 16 of the multi-wall blade through at least one trailing edge passage 344.

Figure 11:
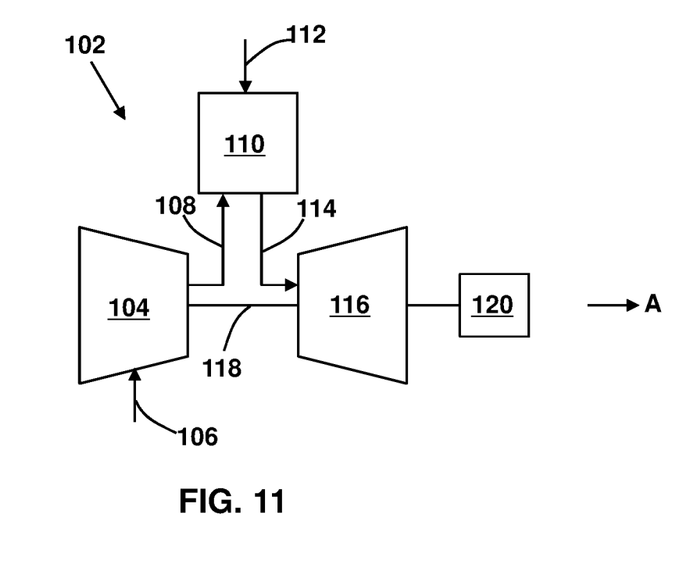
FIG. 11 is a schematic diagram of a gas turbine system according to various embodiments.

FIG. 11 shows a schematic view of gas turbomachine 102 as may be used herein. The gas turbomachine 102 may include a compressor 104. The compressor 104 compresses an incoming flow of air 106. The compressor 104 delivers a flow of compressed air 108 to a combustor 110. The combustor 110 mixes the flow of compressed air 108 with a pressurized flow of fuel 112 and ignites the mixture to create a flow of combustion gases 114. Although only a single combustor 110 is shown, the gas turbine system 102 may include any number of combustors 110. The flow of combustion gases 114 is in turn delivered to a turbine 116, which typically includes a plurality of the turbomachine blades 2 (FIG. 1). The flow of combustion gases 114 drives the turbine 116 to produce mechanical work. The mechanical work produced in the turbine 116 drives the compressor 104 via a shaft 118, and may be used to drive an external load 120, such as an electrical generator and/or the like.

In various embodiments, components described as being "coupled" to one another can be joined along one or more interfaces. In some embodiments, these interfaces can include junctions between distinct components, and in other cases, these interfaces can include a solidly and/or integrally formed interconnection. That is, in some cases, components that are "coupled" to one another can be simultaneously formed to define a single continuous member. However, in other embodiments, these coupled components can be formed as separate members and be subsequently joined through known processes (e.g., fastening, ultrasonic welding, bonding).

When an element or layer is referred to as being "on", "engaged to", "connected to" or "coupled to" another element, it may be directly on, engaged, connected or coupled to the other element, or intervening elements may be present. In contrast, when an element is referred to as being "directly on," "directly engaged to", "directly connected to" or "directly coupled to" another element, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A cooling system for a multi-wall blade, the multi-wall blade comprising a leading edge, a trailing edge, and a location of maximum thickness positioned closer to the leading edge than the trailing edge, the cooling system comprising:
   a leading edge cooling circuit, an entirety of the leading edge cooling circuit being positioned between the location of maximum thickness and the leading edge, the leading edge cooling circuit including at least one pressure side channel and at least one suction side channel;
   a first mid-blade cooling circuit including a suction side serpentine circuit;
   a second mid-blade cooling circuit including a pressure side serpentine circuit;
   a trailing edge cooling circuit;
   at least one air feed for supplying cooling air to each of the leading edge cooling circuit, the first mid-blade cooling circuit, the second mid-blade cooling circuit, and the trailing edge cooling circuit;
   a first central cavity for collecting cooling air exiting the at least one pressure side channel of the leading edge cooling circuit and cooling air exiting the at least one suction side channel of the leading edge cooling circuit, wherein the first central cavity is separated from a pressure side of an outer wall of the multi-wall blade by the at least one pressure side channel of the leading edge cooling circuit and wherein the first central cavity is separated from a suction side of the outer wall of the multi-wall blade by the at least one suction side channel of the leading edge cooling circuit;
   a leading edge cavity of the multi-wall blade; and
   at least one channel for directing a first portion of the collected cooling air from the first central cavity to the leading edge cavity of the multi-wall blade.

2. The cooling system of claim 1, wherein the at least one pressure side channel of the leading edge cooling circuit comprises a multi-pass serpentine circuit, and wherein the at least one suction side channel of the leading edge cooling circuit comprises a multi-pass serpentine circuit.

3. The cooling system of claim 1, further comprising:
   at least one tip film channel for exhausting a second portion of the collected cooling air from a tip of the multi-wall blade as tip cooling film; and
   at least one leading edge film channel for exhausting the first portion of the collected cooling air from the leading edge cavity to the leading edge of the multi-wall blade to provide film cooling of the leading edge.

4. The cooling system of claim 1, further comprising at least one channel for directing cooling air exiting the suction side serpentine circuit of the first mid-blade cooling circuit to a suction side platform of the multi-wall blade.

5. The cooling system of claim 4, further comprising at least one film aperture in a surface of the suction side platform of the multi-wall blade for exhausting the cooling air from the suction side platform of the multi-wall blade as cooling film.

6. The cooling system of claim 1, further comprising:
   a second central cavity for receiving cooling air exiting the pressure side serpentine circuit of the second mid-blade cooling circuit;
   at least one channel for directing the received cooling air from the second central cavity into a platform core of the multi-wall blade; and
   at least one film aperture for exhausting cooling air from the platform core to a pressure side platform of the multi-wall blade as cooling film.

7. The cooling system of claim 1, wherein the trailing edge cooling circuit comprises a serpentine circuit.

8. The cooling system of claim 7, further comprising at least one passage for exhausting cooling air from the serpentine circuit of the trailing edge cooling circuit from a trailing edge of the multi-wall blade.

9. The cooling system of claim 1, wherein:
   the at least one pressure side channel and the at least one suction side channel of the leading edge cooling circuit comprise respective aft-flowing multi-pass serpentine circuits;
   the suction side serpentine circuit of the first mid-blade cooling circuit comprises an aft-flowing multi-pass serpentine circuit;
   the pressure side serpentine circuit of the second mid-blade cooling circuit comprises a forward-flowing multi-pass serpentine circuit; and
   the trailing edge cooling circuit includes an aft-flowing multi-pass serpentine circuit.

10. A multi-wall turbine blade, comprising:
   a leading edge, a trailing edge, and a location of maximum thickness positioned closer to the leading edge than the trailing edge;
   a cooling system disposed within the multi-wall turbine blade, the cooling system including:
      a leading edge cooling circuit, an entirety of the leading edge cooling circuit being positioned between the location of maximum thickness and the leading edge, the leading edge cooling circuit including at least one pressure side channel and at least one suction side channel;
      a first mid-blade cooling circuit including a suction side serpentine circuit;
      a second mid-blade cooling circuit including a pressure side serpentine circuit;
      a trailing edge cooling circuit; and
      at least one air feed for supplying cooling air to each of the leading edge cooling circuit, the first mid-blade cooling circuit, the second mid-blade cooling circuit, and the trailing edge cooling circuit;
      a first central cavity for collecting cooling air exiting the at least one pressure side channel of the leading edge cooling circuit and cooling air exiting the at least one suction side channel of the leading edge cooling circuit, wherein the first central cavity is separated from a pressure side of an outer wall of the multi-wall blade by the at least one pressure side channel of the leading edge cooling circuit and wherein the first central cavity is separated from a suction side of the outer wall of the multi-wall blade by the at least one suction side channel of the leading edge cooling circuit;
      a leading edge cavity of the multi-wall blade; and at least one channel for directing a first portion of the collected cooling air from the first central cavity to the leading edge cavity of the multi-wall blade.

11. The multi-wall turbine blade of claim 10, wherein the at least one pressure side channel of the leading edge cooling circuit comprises a multi-pass serpentine circuit, and wherein the at least one suction side channel of the leading edge cooling circuit comprises a multi-pass serpentine circuit.

12. The multi-wall turbine blade of claim 10, further comprising:
    at least one tip film channel for exhausting a second portion of the collected cooling air from a tip of the multi-wall blade as tip cooling film; and
    at least one leading edge film channel for exhausting the first portion of the collected cooling air from the leading edge cavity to the leading edge of the multi-wall blade to provide film cooling of the leading edge.

13. The multi-wall turbine blade of claim 10, further comprising:
    a second central cavity for receiving cooling air exiting the pressure side serpentine circuit of the second mid-blade cooling circuit;
    at least one channel for directing the received cooling air from the second central cavity into a platform core of the multi-wall blade; and
    at least one film aperture for exhausting cooling air from the platform core to a pressure side platform of the multi-wall blade as cooling film.

14. The multi-wall turbine blade of claim 10, wherein the trailing edge cooling circuit comprises a serpentine circuit.

15. The multi-wall turbine blade of claim 14, further comprising at least one passage for exhausting cooling air from the serpentine circuit of the trailing edge cooling circuit from the trailing edge of the multi-wall blade.

16. A turbomachine, including:
    a gas turbine system including a compressor component, a combustor component, and a turbine component, the turbine component including a plurality of turbomachine blades, and wherein at least one of the turbomachine blades includes a multi-wall blade, the multi-wall blade including a leading edge, a trailing edge, and a location of maximum thickness positioned closer to the leading edge than the trailing edge; and
    a cooling system disposed within the multi-wall blade, the cooling system including:
        a leading edge cooling circuit, an entirety of the leading edge cooling circuit being positioned between the location of maximum thickness and the leading edge, the leading edge cooling circuit including at least one pressure side channel and at least one suction side channel;
        a first mid-blade cooling circuit including a suction side serpentine circuit;
        a second mid-blade cooling circuit including a pressure side serpentine circuit;
        a trailing edge cooling circuit including a serpentine circuit;
        at least one air feed for supplying cooling air to each of the leading edge cooling circuit, the first mid-blade cooling circuit, the second mid-blade cooling circuit, and the trailing edge cooling circuit;
        a central cavity for collecting cooling air exiting the at least one pressure side channel of the leading edge cooling circuit and cooling air exiting the at least one suction side channel of the leading edge cooling circuit, wherein the central cavity is separated from a pressure side of an outer wall of the multi-wall blade by the at least one pressure side channel of the leading edge cooling circuit and wherein the central cavity is separated from a suction side of the outer wall of the multi-wall blade by the at least one suction side channel of the leading edge cooling circuit;
        at least one tip film channel for exhausting a first portion of the collected cooling air from the central cavity from a tip of the multi-wall blade as tip cooling film;
        a leading edge cavity of the multi-wall blade;
        at least one channel for directing a second portion of the collected cooling air from the central cavity to the leading edge cavity of the multi-wall blade; and
        at least one leading edge film channel for exhausting the second portion of the collected cooling air from the leading edge cavity to the leading edge of the multi-wall blade to provide film cooling of the leading edge.

* * * * *